United States Patent
Haddad et al.

(10) Patent No.: US 11,968,207 B2
(45) Date of Patent: Apr. 23, 2024

(54) APPARATUS AND METHODS FOR REVERSE IDENTIFICATION AND AUTHENTICATION

(71) Applicant: Bank of America Corporation, Charlotte, NC (US)

(72) Inventors: Linda Haddad, Concord, CA (US); Lauren K. Alleman, Alameda, CA (US); Casey Andrew Augustine, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 350 days.

(21) Appl. No.: 17/550,151

(22) Filed: Dec. 14, 2021

(65) Prior Publication Data
US 2023/0188517 A1    Jun. 15, 2023

(51) Int. Cl.
*H04L 9/40* (2022.01)

(52) U.S. Cl.
CPC ...... *H04L 63/0853* (2013.01); *H04L 63/0884* (2013.01); *H04L 63/18* (2013.01)

(58) Field of Classification Search
CPC . H04L 63/0853; H04L 63/0884; H04L 63/18; H04L 63/083
See application file for complete search history.

(56) References Cited

U.S. PATENT DOCUMENTS

| | | | |
|---|---|---|---|
| 11,449,875 B1 * | 9/2022 | Alexander | G06F 16/29 |
| 2018/0020348 A1 * | 1/2018 | Peterson | H04L 63/102 |

* cited by examiner

*Primary Examiner* — Huan V Doan
(74) *Attorney, Agent, or Firm* — Weiss & Arons LLP

(57) ABSTRACT

Apparatus and methods for reverse identification and authentication are provided. The apparatus and methods may include a server receiving a request from a user device to authenticate an entity, forming a communication channel between the entity and the user device, requesting the entity provide authentication credentials, and authenticating the entity. When the entity is authenticated, the server may notify the user through the authentication channel, a mobile device application, or another method. An entity may proactively authenticate itself to a user through the central server, in anticipation of a communication between the entity and user.

20 Claims, 6 Drawing Sheets

APPARATUS AND METHODS FOR REVERSE IDENTIFICATION AND AUTHENTICATION

FIELD OF TECHNOLOGY

Aspects of the disclosure relate to providing apparatus and methods for reverse identification and authentication of an entity by a user.

BACKGROUND OF THE DISCLOSURE

Customers, employees, and others are required to authenticate themselves multiple times a day. Current authentication methods may include usernames and passwords, PINs, biometric authentication, and other methods. Current authentication methods and paradigms enable an entity, such as a company, government, building, website, service, or an application, to identify and authenticate any user who wants to use the company, government, building, website, application, or service etc.

However, it is difficult for a user to identify and authenticate the entity. For example, a financial institution may call a user to complete or authorize a transaction. The user, beyond caller ID, may have no ability to accurately identify or authenticate the entity other than trust. As malicious actors increase in number and sophistication, it is possible to spoof a caller ID to make it appear that a malicious call is originating from a trusted phone number and entity.

One solution is for the user to only discuss sensitive information when the user initiates the call. However, this solution may take extra time and effort by the user, and the user may skip these extra steps. Further, it may be difficult for a user to reach a particular employee of a large entity without a direct number, which may frustrate the user.

Beyond telephonic calls, it may be difficult for a user to identify and authenticate the sender of a text message, email, instant message, or other types of communication.

Therefore, it would be desirable for apparatus and methods to enable users to identify and authenticate an entity. This may be referred to as reverse identification and authentication by a user of an entity.

SUMMARY OF THE DISCLOSURE

It is an object of this disclosure to provide apparatus and methods to enable users to identify and authenticate an entity, contrasted to current practice of entities authenticating users.

An apparatus for reverse authentication between a user and an entity is provided. Reverse authentication may refer to a user authenticating an entity, contrasted to an entity authenticating a user. The apparatus may include a central server, an entity hub, and a user device. Each may be a computing device of various form factors.

The central server may include a server communication link, a server processor, and a server non-transitory memory. The memory may be configured to store a server operating system and an authentication engine that may run on the server processor.

The entity hub may include an entity hub communication link, an entity hub processor, and entity hub non-transitory memory. The memory may be configured to store an entity hub operating system and an entity authentication program that may run on the processor and may communicate with the authentication engine. In an embodiment, the entity authentication program may communicate with the user device, a device authentication program, as well as other devices or programs.

The user device may include a device communication link, a device processor, and device non-transitory memory. The memory may be configured to store a device operating system, and a device authentication program. The program may run on the device processor and may communicates with the authentication engine. In an embodiment, the device authentication program may communicate with the entity hub, the entity authentication program, as well as other devices or programs.

The server may receive a request to communicate an authentication request to the entity through the authentication engine, the server may transmit an authentication request to the entity hub. The user may transmit this request, through the device authentication program, to the server. The entity hub may then receive the authentication request. The entity hub, through the entity authentication program, may respond to the authentication request with an authenticating response. The entity hub may transmit the response to the server, and when the authentication engine confirms the response as authenticating the entity hub, the server may authenticate the entity hub and transmit the response to the user device. The user may then know the entity has been authenticated.

In an embodiment, the user device may be a smartphone or other mobile computing device.

In an embodiment, the user may request that the server communicate the authentication request to the entity while a representative of the entity is speaking with the user. A representative may include an interactive voice system, a computer, as well as one or more human beings. In an embodiment, the user may request that the server communicate the authentication request to the entity before a representative of the entity speaks with the user.

In an embodiment, the entity hub may request the server communicate authentication details to the user before the entity communicates with the user. This proactive authentication may include a pre-determined time limit. For example, if an entity desires to communicate with a user at a particular time, it may communicate with the server or the user device, informing the user to expect a communication from the entity at a particular time. Further details may be included in the proactive authentication.

In an embodiment, the authenticating response may include one or more quanta of information about the representative of the entity.

In an embodiment, the one or more quanta of information may include an employee identification number and a name of the representative.

In an embodiment, the user request may include one or more quanta of authentication information of the user. In this embodiment, the apparatus may include the ability to authenticate the user as well as authenticate the entity.

In an embodiment, the authentication server may authenticate the user and transmit the user authentication to the entity hub together with the user request for authentication of the entity hub.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
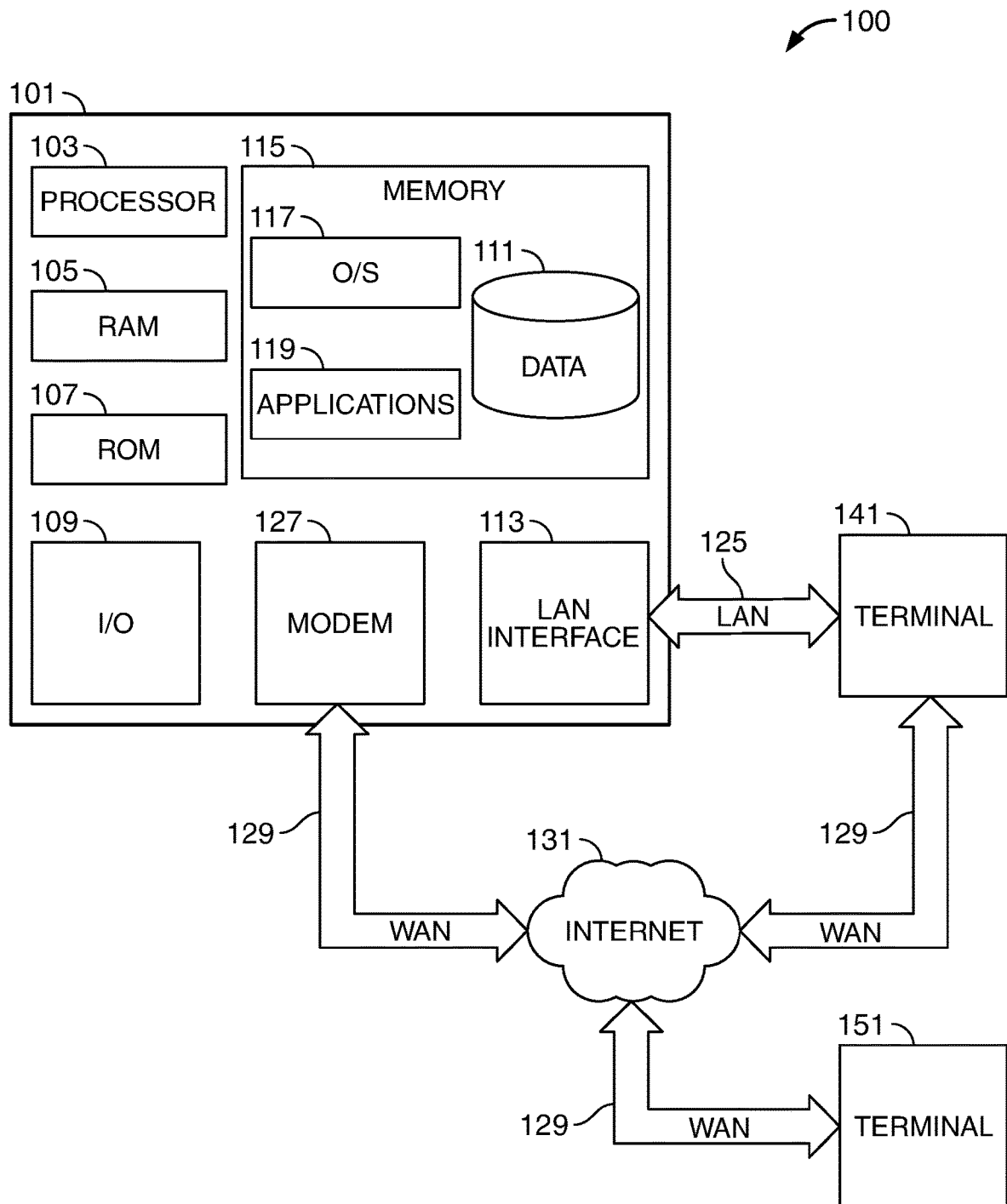
FIG. 1 shows an illustrative apparatus in accordance with principles of the disclosure.

It is an object of this disclosure to provide apparatus and methods to enable users to identify and authenticate an entity, in contrast to the current practice of entities authenticating users, and only entities authenticating users. In this disclosure, an entity may include a company, government, building, website, service, an application, an individual, and other entities.

An apparatus for reverse authentication between a user and an entity is provided. Reverse authentication may refer to a user authenticating an entity, contrasted to an entity authenticating a user. The apparatus may include a central server, an entity hub, and a user device. Each of these devices may be a computing device, in various form factors such as mobile phones, smart cards, desktops, laptops, tablets, etc.

The central server may include a server communication link, a server processor, and a server non-transitory memory. The memory may be configured to store a server operating system and an authentication engine that may run on the server processor.

In an embodiment, the central server may be distributed, to utilize a larger pool of computing resources and provide redundancy. Centralized servers may be easier to secure but also provide a single failure point. Distributed servers may be more robust but may provide multiple avenues for malicious actors to target. A preferred embodiment may be a centralized server.

The server communication link may enable communication with the entity hub, user device, and other computers/servers as needed. All communication links in this disclosure may include any necessary hardware (e.g., antennae) and software to control the link. Any appropriate communication link may be used. In an embodiment, the apparatus may use a network. In an embodiment, that network may be the Internet. In another embodiment, the network may be an internal intranet. An internal intranet may be more limited than the Internet, but it may also be more secure.

The server may include a server processor or processors, as well as server non-transitory memory. The server non-transitory memory may include an operating systems as well as an authentication engine/program/module that runs on the processor. The memory may also include any other necessary programs or data to run. In an embodiment, the server non-transitory memory may include data, in a database or otherwise, to allow the authentication engine to authenticate a particular entity or user.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

Processor(s) may control the operation of the apparatus and its components, which may include RAM, ROM, an input/output module, and other memory. The microprocessor(s) may also execute all software running on the apparatus—e.g., the operating system and any applications such as the authentication engine and any security protocols. Other components commonly used for computers, such as EEPROM or Flash memory or any other suitable components, may also be part of the apparatus.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, cellular networks, or other suitable frequencies.

Any memory in this disclosure may be comprised of any suitable permanent storage technology—e.g., a hard drive or other non-transitory memory. The memory may store software including an operating system and any application(s) (such as the authentication engine) along with any data needed for the operation of the apparatus and to allow authentication of a user. The data may also be stored in cache memory, or any other suitable memory. Alternatively, some or all of computer executable instructions (alternatively referred to as "code") may be embodied in hardware or firmware.

The authentication engine may be configured to authenticate an entity, authenticate a user, or deny authentication to an entity or user. The authentication engine may be configured to inform the user or the entity as to the status of the authentication, in any direction.

In an embodiment, the entity hub may also function as the central server. Such a setup may be more economical but may be less secure and may provide an easier fail point for malicious actors to attack.

The entity hub may include an entity hub communication link, an entity hub processor, and entity hub non-transitory memory. The memory may be configured to store an entity hub operating system and an entity authentication program that may run on the processor and may communicate with the authentication engine. The entity authentication program may be similar to the authentication engine on the server. The entity authentication program may be a module of the authentication engine.

In an embodiment, the entity authentication program may communicate with the user device, a device authentication program, as well as other devices or programs.

The user device may include a device communication link, a device processor, and device non-transitory memory. The memory may be configured to store a device operating system, and a device authentication program. The program may run on the device processor and may communicates with the authentication engine. In an embodiment, the device authentication program may communicate with the entity hub, the entity authentication program, as well as other devices or programs. The device authentication program may be similar to the authentication engine on the server. The device authentication program may be a module of the authentication engine. The device authentication engine may be a separate application or program. The device authentication engine may be a part of an existing application or program (e.g., a plugin module) and may be configured to be added to numerous and varied existing applications or programs.

When the user requests, through the device authentication program, that the server communicate an authentication request to the entity through the authentication engine, the server may receive the user request and transmit an authentication request to the entity hub. The entity hub may then receive the authentication request. The entity hub, through the entity authentication program, may respond to the authentication request with an authenticating response. The entity hub may transmit the response to the server, and when the authentication engine confirms the response as authenticating the entity hub, the server may authenticate the entity hub and transmit the response to the user device. The user may then know the entity has been authenticated.

In an embodiment, the user device may be a smartphone or other mobile computing device. In this, and other, embodiments, the device authentication engine may utilize smartphone technology such as a touchscreen or biometric sensors. The device authentication engine may be integrated into a stand-alone application or integrated into existing applications. For example, a financial institution may have an existing application for its customers. The device authentication engine may be added to the existing application, providing an easy and useful ability for users to authenticate the financial institution before or during a communication with the financial institution. Various graphical representations of the device authentication engine may be used, such as a check box, an icon, or other appropriate button.

In an embodiment, when the device authentication engine is integrated into an existing application, the user must log into the existing application before authenticating the entity. In another embodiment, the user may be able to authenticate the entity without logging into any existing application.

In an embodiment, the central server may only communicate authentication results back to the user device, when the user device is in communication with the entity. For example, the central server may only inform the user device the entity is authenticated if the user is communicating with the entity using the user device, such as a smartphone. In other embodiments, the user device may be separate from any device the user is communicating with the entity with (e.g., a telephone), such as a separate smart card, or laptop computer.

In an embodiment, the device authentication engine may be configured to report a spam or scam conversation to the actual entity. For example, when a user receives a call from a malicious actor purporting to be the entity, and the user attempts to authenticate, when the authentication fails, a report may be sent to the entity stating that the user attempted to authenticate the entity and that attempt failed. This may increase the tracking of malicious activity and malicious actors impersonating the entity.

In an embodiment, the user may request that the server communicate the authentication request to the entity while a representative of the entity is speaking with the user. A representative may include an interactive voice system, a computer, as well as one or more human beings. For example, if the user device is a smartphone, the user may receive a call from a number purporting to be the entity. Before the user provides any sensitive information, the user may attempt to authenticate the entity. In an embodiment, the authentication may be as simple as pressing a button on a computer or smartphone application and waiting for a response (which may be as simple as the button turning green, or a checkmark, after the server authenticates the entity).

In an embodiment, the user may request that the server proactively communicate the authentication request to the entity before a representative of the entity speaks with the user. For example, if a user is expecting a call or communication from a particular entity at a particular time, the user may request proactive authentication of the entity, before receiving the call or communication.

In an embodiment, the entity may proactively authenticate itself prior to placing a call or communicating with the user. For example, the entity may send a text, email, or a message within an application to a user stating that the user should expect a call or communication from a particular employee at a particular time. This may be enough authentication for a user, but a user may still be able to authenticate the entity again after receiving the call or communication.

In an embodiment, the authenticating response may include one or more quanta of information about the representative of the entity. For example, the one or more quanta of information may include an employee identification number and a name of the representative. Providing this information to the user may produce a second layer of authentication, assuring the user that the user is interacting with the correct representative of the entity. This may be important when interacting with financial or private entities, as only certain employees may have the right or ability to access or know particular information about the user. Providing this information may prevent internal employee malicious actions.

In an embodiment, the user request may include one or more quanta of authentication information of the user. For example, the user may log into a particular smartphone application belonging to the entity. That login information (username and/or password) may be shared with the central server along with the request to authenticate the entity. In this embodiment, the apparatus may include the ability to authenticate the user as well as authenticate the entity.

In an embodiment, the authentication server may authenticate the user and transmit the user authentication to the entity hub together with the user request for authentication of the entity hub. Combining both authentications may save time for both the user and the entity. Further, the user authentication details may only be transmitted to the correct entity, so a malicious actor may not receive the authentication details. Combining user authentication and entity authentication may protect the user and entity from malicious actors.

An apparatus for reverse authentication between a user and an entity is provided. The apparatus may include a central server, a smartphone or other mobile device belonging to the user, and an authentication device belonging to the entity.

The central server may include a communication link, a processor, and non-transitory memory. The memory may be configured to store an operating system and an authentication engine that runs on the processor.

The authentication engine may be configured to: receive a request from the user to authenticate the entity, create an authentication channel between an application on the smartphone and the authentication device, and transmit a request to the entity to provide one or more authentication credentials. And when the entity provides the one or more authentication credentials, the engine may authenticate the entity and notify the user that the entity has been authenticated.

The authentication channel may be a network communication channel between the server, the smartphone, and the authentication device. The channel may be between the smartphone and the authentication device. The channel may be formed over wi-fi, Bluetooth, near-field communication (NFC), or other appropriate apparatus and methods.

When a representative of the entity supplies authenticating information (which may be as simple as hitting a button on the authentication device), that authenticating information may be transmitted over the authentication channel to the smartphone.

In an embodiment, the channel may stay active for a pre-determined amount of time. The pre-determined amount of time may be adjusted manually or through an artificial intelligence/machine learning ("AI/ML") algorithm(s). For example, the amount of time may change based on the entity, the user, or the nature of the communication. If the algorithm learns that a certain type of call will take 30 minutes, it may keep the channel open for multiple or continuous authentication. If the call is anticipated to last less than five minutes, the algorithm may determine that a single authentication by the entity is sufficient. The channel may include a continuous stream of data acting as a signal between the entity and the user device. The signal may be random noise or may contain information authenticating the entity, such as a continuous stream of authenticating data (which may repeat). In other embodiments, the continuous stream of data may be a simple ping message, letting each node on the channel know the channel is open and ready for other data.

In an embodiment, the authentication device may be a computer. For example, an entity's customer service employees may each have a computer (along with a phone system) that they work with. The server may send the authentication request to the computer and the employee may respond. The authentication request may be as simple as selecting a button that pops up on the computer screen. More complex authentication protocols may be used as well, such as entering specific information known only to the entity, or known to the entity and the user.

In another embodiment, the authentication device may be a standalone device, such as a smartcard or key-fob. The entity employee or representative may receive a notification on the device to authenticate, and may authenticate by pressing a button on the device. Other, more complex, authentication protocols may be used as well.

In an embodiment, the authentication channel may display the authentication credentials in real time. For example, an application may display the entity representative's name or employee ID for the duration of the call, as long as the call is not switched from the authentication device.

In an embodiment, if the call is dropped or ends, the representative may close the channel. In an embodiment, the server may close the channel at a pre-determined time. In an embodiment, the user may terminate the authentication channel after a pre-determined length of time or at her discretion. In an embodiment, the pre-determined length of time may be five minutes. In an embodiment, the pre-determined length of time may be varied by an AI/ML algorithm.

In an embodiment, the user may transmit the request to authenticate the entity while the user is speaking with a representative of the entity.

In an embodiment, the notification may include one or more quanta of information about the representative.

In an embodiment, the authentication credentials may be created by the user, stored by the entity in an encrypted file, and only accessible by the entity. For example, when creating an account with an entity, the user may supply one or more passwords or other details that she desires the entity use to authenticate the entity. Those password(s) may be encrypted and stored by the entity in a database accessible only by the entity. When receiving an authentication request, the entity may decrypt those password(s) associated with the user and provide them to the user, through the server or authentication channel, thereby authenticating the entity. The strength of this authentication may depend on the strength of the password(s) provided by the user.

A method for reverse authentication between a user and an entity is provided. The method may include the steps of receiving from the user, at an authentication engine running on a central server, a request to authenticate the entity, creating, by the authentication engine, an authentication channel between the authentication engine, an application on a smartphone belonging to the user, and an authentication device belonging to the entity. The method may include the step of requesting, by the authentication engine, the entity provide one or more authentication credentials. When the entity provides the one or more authentication credentials, the server may authenticate the entity and notify the user that the entity has been authenticated by displaying a graphical notice on the application.

In an embodiment, the authentication device may be a computer.

In an embodiment, the authentication credentials may be created by the user, stored by the entity in an encrypted file, and only accessible by the entity.

In an embodiment, the user may transmit the request to authenticate the entity while the user is speaking with a representative of the entity. In this (and other) embodiment(s), the authentication channel may display the authentication credentials in real time.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a server 101. Server 101 may alternatively be referred to herein as a "computing device." The components of server 101 may also be the same as, or similar to, the components of the entity hub, the user device, the authentication device, and the user's smartphone or other mobile device, as described above. Elements of apparatus 100, including server 101, may be used to implement various aspects of the apparatus and methods disclosed herein. A "user" of apparatus 100 or server 101 may include other computer systems or servers, or a human.

Server 101 may have one or more processors/microprocessors 103 for controlling the operation of the device and its associated components, and may include RAM 105, ROM 107, input/output module 109, and a memory 115. The microprocessors 103 may also execute all software running on the server 101—e.g., the operating system 117 and applications 119 such as the authentication engine and security protocols. Other components commonly used for computers, such as EEPROM or Flash memory or any other suitable components, may also be part of the server 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as the authentication engine) along with any other data 111 (e.g., authentication information for users and entities) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

In an embodiment of the server 101, the microprocessor 103 may execute the instructions in all or some of the operating system 117, any applications 119 in the memory 115, any other code necessary to perform the functions in this disclosure, and any other code embodied in hardware or firmware (not shown).

An input/output ("I/O") module 109 may include connectivity to a keyboard, monitor, microphone, or network interface through which higher hierarchal server or a user of server 101 may provide input. The input may include input relating to cursor movement. The input/output module 109 may also include one or more speakers for providing audio output and a video display device, such as an LED screen and/or touchscreen, for providing textual, audio, audiovisual, and/or graphical output (not shown).

In an embodiment, apparatus 100 may consist of multiple servers 101, along with other devices.

Apparatus 100 may be connected to other systems, computers, servers, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, or servers that include many or all of the elements described above relative to apparatus 100. The network connections depicted in FIG. 1 include a local area network (LAN) 125 and a wide area network (WAN) 129 but may also include other networks. Server 101 may include a network interface controller (not shown), which may include a modem 127 and LAN interface or adapter 113, as well as other components and adapters (not shown).

When used in a LAN networking environment, server 101 is connected to LAN 125 through a LAN interface or adapter 113. When used in a WAN networking environment, server 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The server may transmit data to any other suitable computer system. The server may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for invoking user functionality related to performing various tasks. In an embodiment, application program(s) 119 may be cloud-based applications. In an embodiment, application program(s) 119 may be an authentication engine and/or security protocols. In an embodiment, the authentication engine may use AI/ML algorithm(s). The various tasks may be related to reverse authentication of an entity by a user.

Server 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, smart mobile device, or any other suitable device for receiving, storing, transmitting and/or displaying relevant information. Terminal 151 and/or terminal 141 may be other devices such as remote servers. The terminals 151 and/or 141 may be computers where the user is interacting with the application that is being monitored by apparatus 100.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, server computers, hand-held or laptop devices, tablets, mobile phones, smart phones, smart mobile devices, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
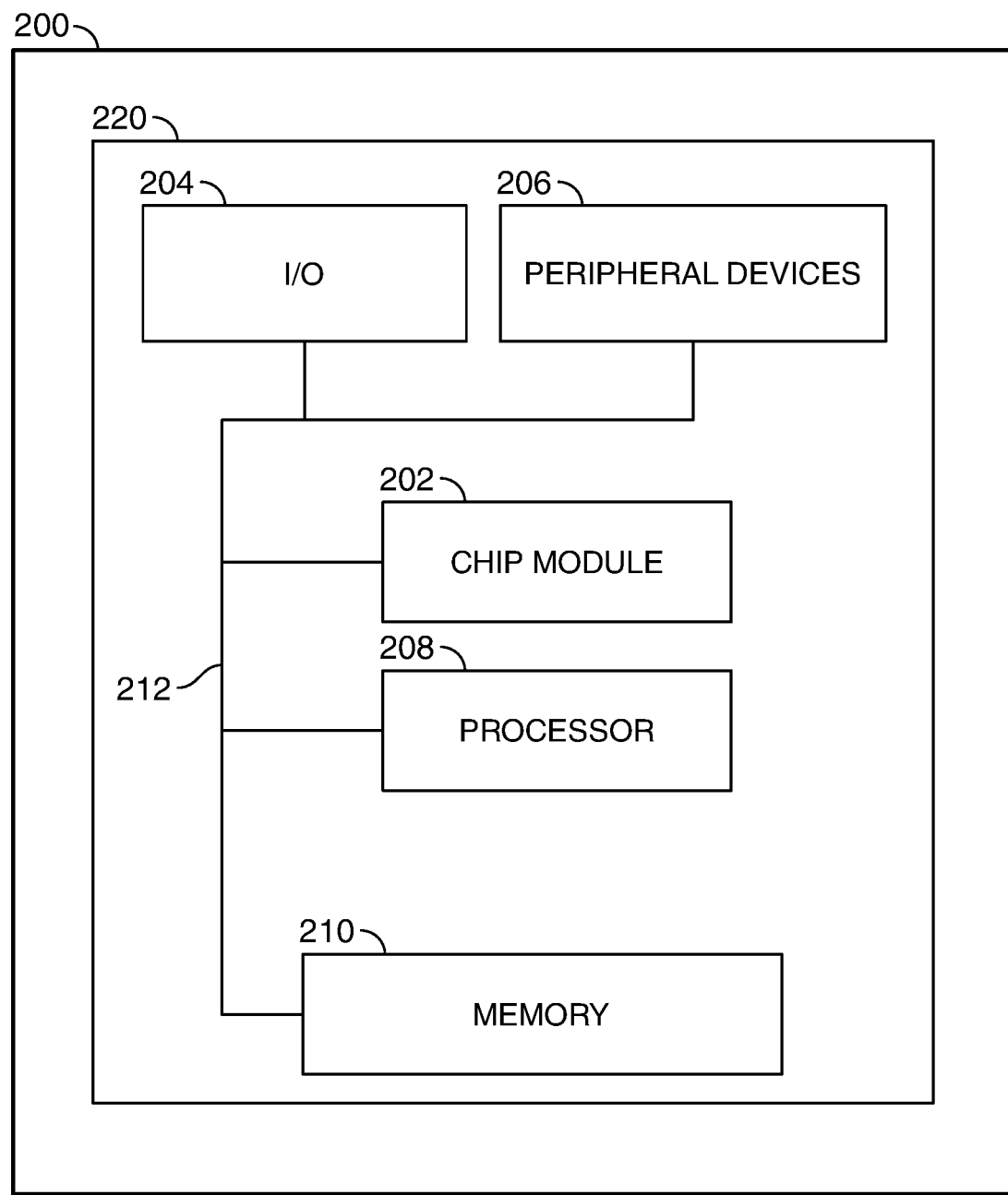
FIG. 2 shows an illustrative apparatus in accordance with principles of the disclosure.

FIG. 2 shows illustrative apparatus 200 that may be configured in accordance with the principles of the disclosure. Apparatus 200 may be a smartphone, entity hub, authentication device, user device, computer, or server with various peripheral devices 206. Apparatus 200 may include one or more features of the apparatus shown in FIGS. 1, 3A, 3B, and 4.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an LED screen, a touchscreen or any other suitable media or devices; peripheral devices 206, which may include hands-free smart mobile devices; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3A:
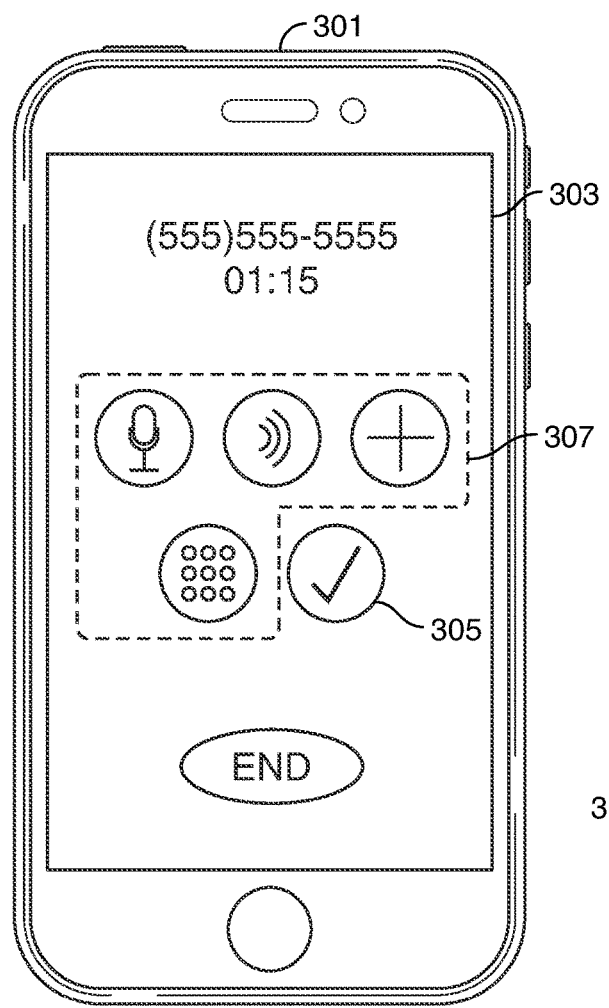
FIG. 3A shows an illustrative apparatus in accordance with principles of the disclosure.
Figure 3B:
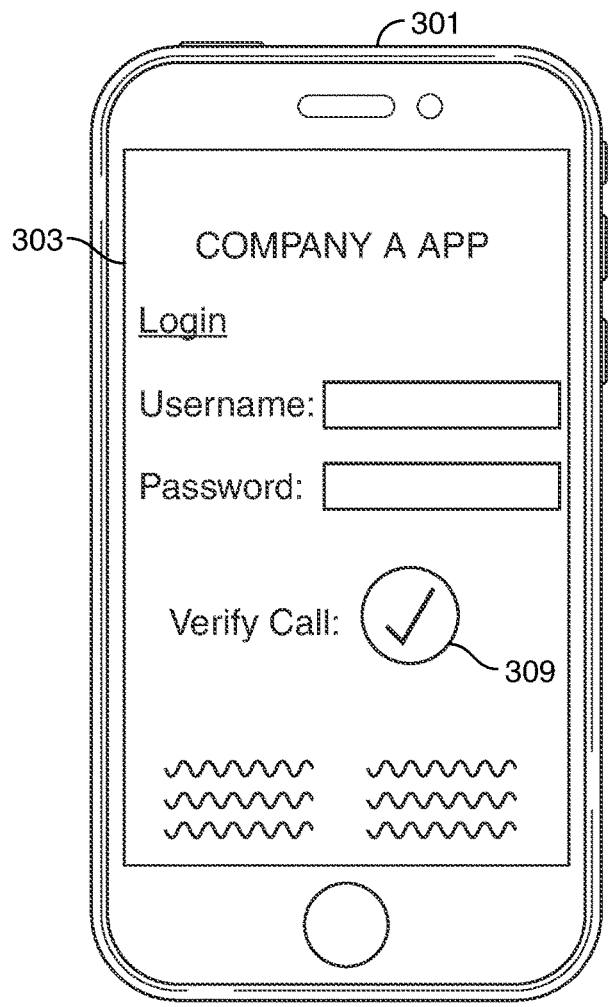
FIG. 3B shows an illustrative apparatus in accordance with principles of the disclosure.

FIGS. 3A and 3B show illustrative apparatus in accordance with principles of the disclosure. A smart mobile device 301 may include a screen 303. In FIG. 3A, the screen 303 displays an exemplary call screen with various typical call options 307. In an embodiment, during the call, an entity authentication button 305 may also be displayed on screen 303. While speaking with an entity, a user (not shown) may press authentication button 305 to begin the process of authenticating the entity. If the entity is authenticated, in an embodiment, the authentication button 305 may turn green in color, and may turn red in color if the entity is not authenticated. Other options for informing the user of the status of the entity may be used (such as a sound, a haptic response, or others).

In FIG. 3B, the screen 303 is displaying an exemplary entity (company A) application. Before, during, or after logging into the application, a user (not shown) may press button 309 to verify and authenticate the entity (company A). The button 309 may be placed in any appropriate location or screen within the application.

Figure 4:
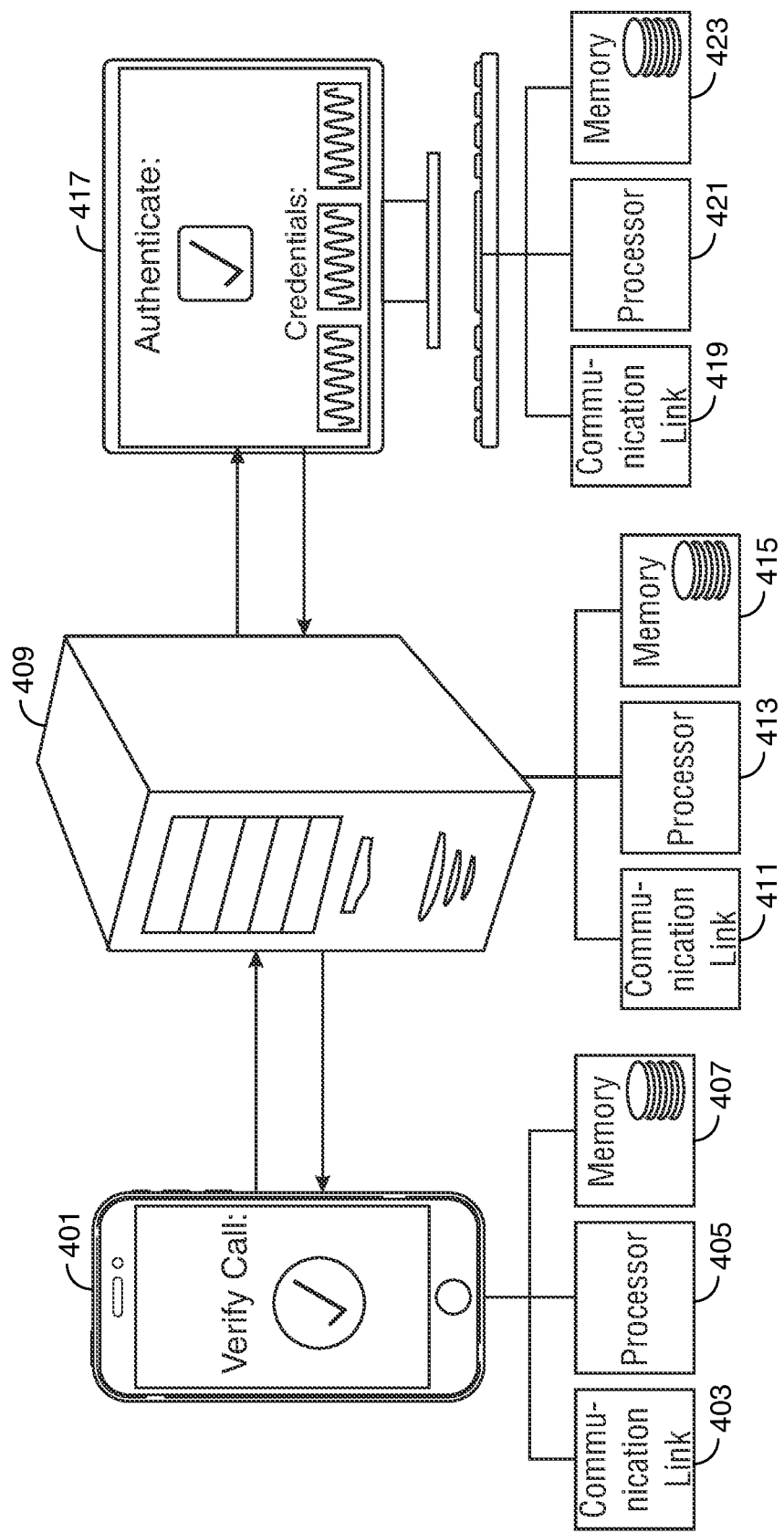
FIG. 4 shows an illustrative schematic in accordance with principles of the disclosure.

FIG. 4 shows an illustrative schematic in accordance with principles of the disclosure. User device 401 may be a smartphone or other mobile computing device. User device 401 may include a user device communication link 403, a user device processor 405, user device memory 407, as well as other components (not shown). User device 401 may communicate with server 409, and receive communications from server 409.

Server 409 may include server communication link 411, server processor 413, server memory 415, as well as other components (not shown). Server 409 may communicate with user device 401 and entity hub 417.

Entity hub 417 may include entity hub communication link 419, entity hub processor 421, entity hub memory 423, as well as other components (not shown). The entity hub may communicate with server 409.

In an embodiment, entity hub 417 and user device 401 may communicate with each other, as well as server 409.

A request to authenticate an entity may be transmitted from user device 401 to server 409, and from server 409 to entity hub 417. Entity hub 417's response may be transmitted to server 409 and communicated with user device 401 when the hub 417 is authenticated or not.

Figure 5:
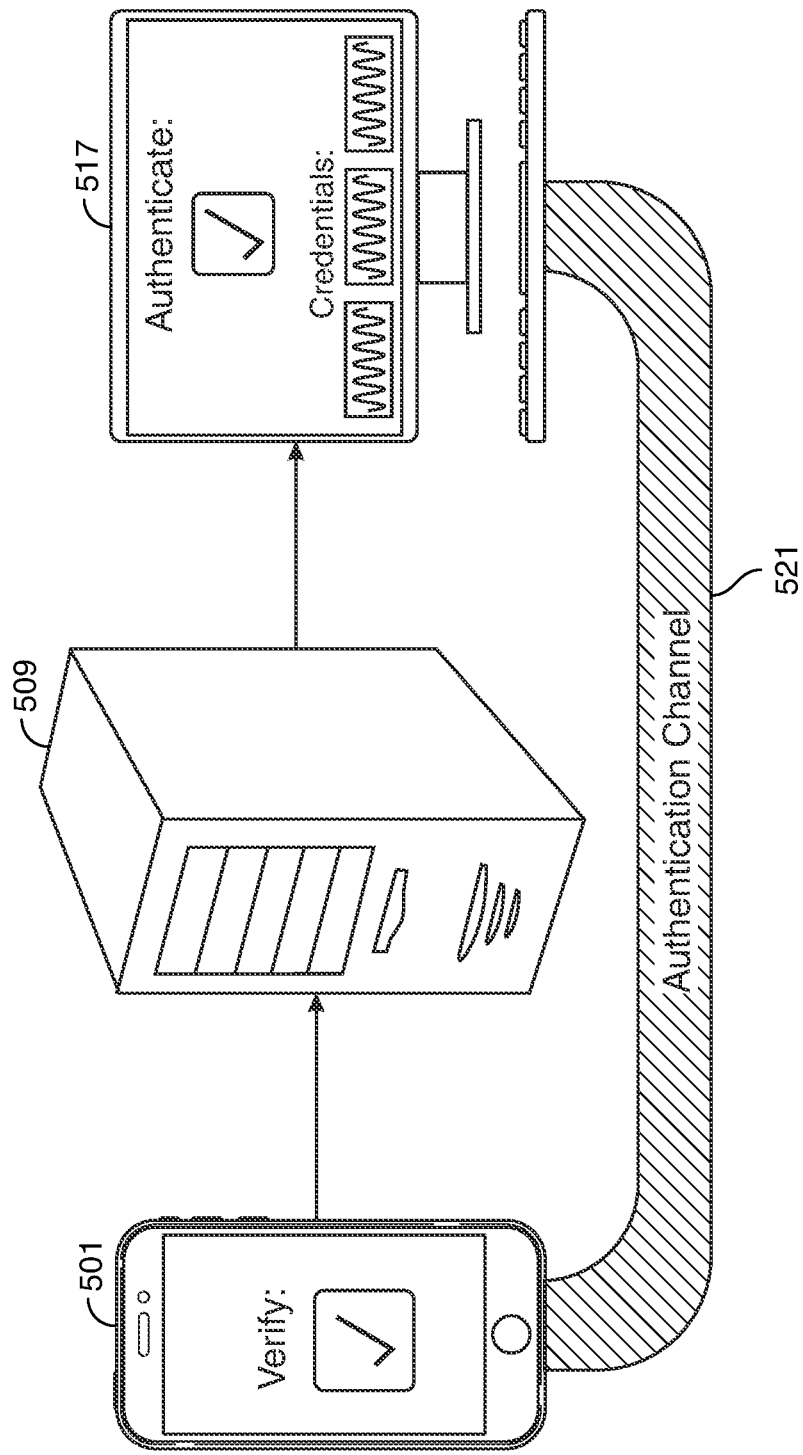
FIG. 5 shows an illustrative schematic in accordance with principles of the disclosure.

FIG. 5 shows an illustrative schematic in accordance with principles of the disclosure. User device 501 may communicate with server 509. Server 509 may communicate with entity hub 517. Hub 517 may be an authentication device. An authentication channel 521 may be created between hub 517 and user device 501. In an embodiment, the authentication channel 521 may also include server 509.

Figure 6:
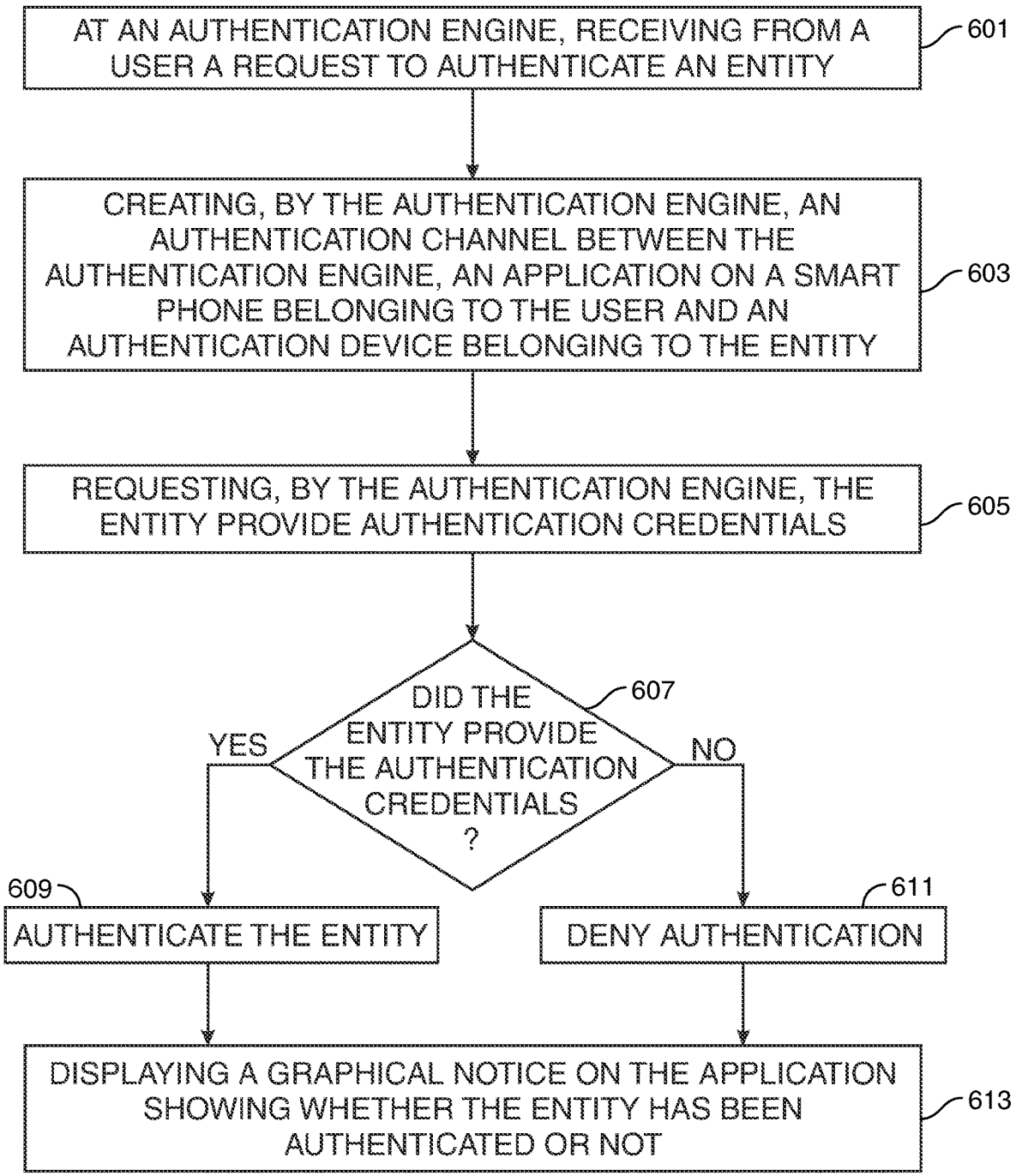
FIG. 6 shows an illustrative flowchart in accordance with principles of the disclosure.

FIG. 6 shows an illustrative flowchart in accordance with principles of the disclosure. Methods may include some or all of the method steps numbered 601 through 613. Methods may include the steps illustrated in FIG. 6 in an order different from the illustrated order. The illustrative method shown in FIG. 6 may include one or more steps performed in other figures or described herein. Steps 601 through 617 may be performed on the apparatus shown in FIGS. 1-5, or other apparatus.

At step 601, an authentication engine may receive a request to authenticate an entity from a user. The request may come from a software application or hardware combined with software (such as a smartphone with a physical button for authenticating). The authentication engine may be located on a server, which may be centralized or distributed in various embodiments.

At step 603, the authentication engine may create an authentication channel between the authentication engine, an application on a smartphone belonging to the user, and an authentication device belonging to the entity. In other embodiments, the application may be on a different computing device belonging to the user. In an embodiment, the authentication device may be a computer.

At step 605, the authentication engine may request the entity provide authentication credentials. At step 607, the engine may determine if the entity provided any (and the correct) authentication credentials. If the entity did provide the correct authentication credentials, at step 609, the authentication engine may authenticate the entity. If the entity did not provide any or the correct credentials, at step 611 the engine may deny authentication to the entity. In either event, at step 613, the engine may display a graphical (or other) notice on the application displaying whether the entity has been authenticated or not.

The engine may use the authentication channel to communicate between the application and authentication device, and in an embodiment, the application and authentication device may communicate with each other using the authentication channel.

Thus, apparatus and methods for reverse authentication of an entity by a user are provided. Persons skilled in the art will appreciate that the present invention can be practiced by other than the described embodiments, which are presented for purposes of illustration rather than of limitation.

What is claimed is:

1. An apparatus for reverse authentication between a user and an entity, the apparatus comprising:
    a central server, the central server comprising:
        a server communication link;
        a server processor; and
        a server non-transitory memory configured to store at least:
            a server operating system; and
            an authentication engine that runs on the server processor;
    an entity hub, the entity hub comprising:
        an entity hub communication link;
        an entity hub processor;
        an entity hub non-transitory memory configured to store at least:
            an entity hub operating system; and
            an entity authentication program that runs on the entity hub processor and communicates with the authentication engine;
    a user device, the user device comprising:
        a device communication link;
        a device processor; and
        a device non-transitory memory configured to store at least:
            a device operating system; and
            a device authentication program that runs on the device processor and communicates with the authentication engine;
    wherein: when the server receives a request from the user device to communicate an authentication request to the entity through the authentication engine:
        the server transmits the authentication request to the entity hub;
        the entity hub receives the authentication request;
        the entity hub, through the entity authentication program, responds to the authentication request with an authenticating response;
        the entity hub transmits the authenticating response to the server; and
        when the authentication engine confirms the authenticating response, the server authenticates the entity hub and transmits an authenticating result to the user device.

2. The apparatus of claim 1 wherein the user device is a smartphone.

3. The apparatus of claim 1 wherein the user requests that the server communicate the authentication request to the entity while a representative of the entity is speaking with the user.

4. The apparatus of claim 3 wherein the authenticating response includes one or more quanta of information about the representative.

5. The apparatus of claim 4 wherein the one or more quanta of information includes an employee identification number and a name of the representative.

6. The apparatus of claim 1 wherein the user request includes one or more quanta of authentication information of the user.

7. The apparatus of claim 6 wherein the authentication server authenticates the user and transmits the user authentication to the entity hub together with the user request.

8. An apparatus for reverse authentication between a user and an entity, the apparatus comprising:
    a central server, the central server comprising:
        a communication link;
        a processor;
        a non-transitory memory configured to store at least:
            an operating system; and
            an authentication engine that runs on the processor;
    a smartphone belonging to the user; and
    an authentication device belonging to the entity;
    wherein the authentication engine is configured to:
        receive a request from the user to authenticate the entity;
        create an authentication channel between an application on the smartphone and the authentication device;
        request the entity provide one or more authentication credentials;
        when the entity provides the one or more authentication credentials, authenticate the entity; and
        notify the user that the entity has been authenticated.

9. The apparatus of claim 8 wherein the authentication device is a computer.

10. The apparatus of claim 8 wherein the authentication channel displays the authentication credentials in real time.

11. The apparatus of claim 8 wherein the server terminates the authentication channel after a pre-determined length of time.

12. The apparatus of claim 11 wherein the pre-determined length of time is five minutes.

13. The apparatus of claim 8 wherein the user transmits the request to authenticate the entity while the user is speaking with a representative of the entity.

14. The apparatus of claim 13 wherein the notification includes one or more quanta of information about the representative.

15. The apparatus of claim 8 wherein the one or more authentication credentials are:
    a) created by the user;
    b) stored by the entity in an encrypted file; and
    c) only accessible by the entity.

16. A method for reverse authentication between a user and an entity, the method comprising:
    receiving from the user, at an authentication engine running on a central server, a request to authenticate the entity;
    creating, by the authentication engine, an authentication channel between the authentication engine, an application on a smartphone belonging to the user, and an authentication device belonging to the entity;
    requesting, by the authentication engine, the entity provide one or more authentication credentials;
    when the entity provides the one or more authentication credentials, authenticating the entity; and
    notifying the user that the entity has been authenticated by displaying a graphical notice on the application.

17. The method of claim 16 wherein the authentication device is a computer.

18. The method of claim 16 wherein the one or more authentication credentials are:
   d) created by the user;
   e) stored by the entity in an encrypted file; and
   f) only accessible by the entity.

19. The method of claim 16 wherein the user transmits the request to authenticate the entity while the user is speaking with a representative of the entity.

20. The method of claim 19 wherein the authentication channel displays the authentication credentials in real time.

\* \* \* \* \*